US012564958B2

(12) United States Patent
Lee et al.

(10) Patent No.: US 12,564,958 B2
(45) Date of Patent: Mar. 3, 2026

(54) CONTROLLING A MOBILE ROBOT

(71) Applicant: Intel Corporation, Santa Clara, CA (US)

(72) Inventors: Eng Kwong Lee, Penang (MY); Bernd Gassmann, Straubenhardt (DE); Ying Wei Liew, Penang (MY); Say Chuan Tan, Penang (MY); Frederik Pasch, Karlsruhe (DE); Fabian Oboril, Karlsruhe (DE); Cornelius Buerkle, Karlsruhe (DE); Chien Chern Yew, Penang (MY)

(73) Assignee: Intel Corporation, Santa Clara, CA (US)

( * ) Notice: Subject to any disclaimer, the term of this patent is extended or adjusted under 35 U.S.C. 154(b) by 740 days.

(21) Appl. No.: 17/556,246

(22) Filed: Dec. 20, 2021

(65) Prior Publication Data

US 2022/0111523 A1     Apr. 14, 2022

(51) Int. Cl.
B25J 9/16      (2006.01)
B25J 5/00      (2006.01)
G05D 1/00      (2024.01)

(52) U.S. Cl.
CPC ............. B25J 9/1666 (2013.01); B25J 5/007 (2013.01); B25J 9/1676 (2013.01); G05D 1/0214 (2013.01); G05D 1/0223 (2013.01); G05D 1/0274 (2013.01)

(58) Field of Classification Search
CPC ........ B25J 9/1666; B25J 5/007; B25J 9/1676; G05D 1/0214; G05D 1/0223; G05D 1/0274; G05D 1/0297; G05D 1/0276
See application file for complete search history.

(56) References Cited

U.S. PATENT DOCUMENTS

| | | | | |
|---|---|---|---|---|
| 8,892,256 | B2 * | 11/2014 | Friedman | .............. A47L 9/2852 700/250 |
| 11,681,293 | B2 * | 6/2023 | Van Der Merwe | .. G05D 1/0255 701/24 |
| 2003/0117274 | A1 * | 6/2003 | Kuragaki | .............. G08G 1/205 340/436 |

(Continued)

FOREIGN PATENT DOCUMENTS

CN          116300858 A       6/2023

*Primary Examiner* — Abby Lin
*Assistant Examiner* — Danielle M Jackson
(74) *Attorney, Agent, or Firm* — Schwegman Lundberg & Woessner, P.A.

(57)          ABSTRACT

Systems and techniques for controlling a mobile robot. In an example, the system may include a processor and memory, including instructions, which when executed by the processor, cause the processor to determine a state of the mobile robot. The state of the mobile robot may be determined using at least one of: data provided by the mobile robot or data captured by one or more sensors proximate to or attached to the mobile robot. The system may determine a state of an object proximate to the mobile robot using the data captured by the one or more sensors, and identify information relating to one or more available stopping points. The system may identify a condition of the mobile robot that requires the mobile robot to stop and issue a command to the mobile robot to navigate to a particular one of the one or more available stopping points.

20 Claims, 13 Drawing Sheets

(56) References Cited

U.S. PATENT DOCUMENTS

| | | | |
|---|---|---|---|
| 2016/0115702 A1* | 4/2016 | Nordbruch | G05D 1/0055 |
| | | | 414/231 |
| 2016/0129592 A1* | 5/2016 | Saboo | B25J 5/007 |
| | | | 700/248 |
| 2017/0200372 A1* | 7/2017 | Felix | G08G 1/096775 |
| 2018/0348771 A1* | 12/2018 | Chu | B60W 60/0018 |
| 2020/0346348 A1* | 11/2020 | Zhu | G05B 19/41895 |
| 2021/0139017 A1* | 5/2021 | Sugano | G08G 1/096805 |
| 2022/0171396 A1* | 6/2022 | Lavrenyuk | G05D 1/617 |

* cited by examiner

POI/Stopping Point Identified

Robot Travel Direction

200

CONTROLLING A MOBILE ROBOT

TECHNICAL FIELD

The present disclosure relates to a system for controlling a mobile agent such as a robot. Specifically, the present disclosure relates to monitoring and operational control for assisting an autonomous robot.

BACKGROUND

Mobile robots, such as autonomous robots or robots that are controlled from using an outside source such as a controller or an orchestrator are becoming more prevalent in today's society. For example, mobile robots are being utilized for services such as delivery of small cargo, packages, or the like, food deliveries, or the like. As a result, mobile robots are required to traverse areas that are utilized by the public. For example, mobile robots may be required to move, drive, or the like, along public sidewalks, public streets/roadways, or the like. Additionally, mobile robots may be required to move from public property such as a street/roadway or sidewalk owned by a county, city, township, or the like, onto private property such as a private driveway, a path from a sidewalk to the door of a residence or business, or the like, in order to make or complete a delivery.

Thus, a mobile robot may be required to operate for a long period of time and in turn, be required at some point to stop or be stopped. For example, a mobile robot may require charging or repairs before it can continue to perform a programmed task. In some situations, a mobile robot may act as an obstacle or even present a danger to pedestrians, motorists, or other members of the general public if it breaks down or operates in an out of control manner.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1A:
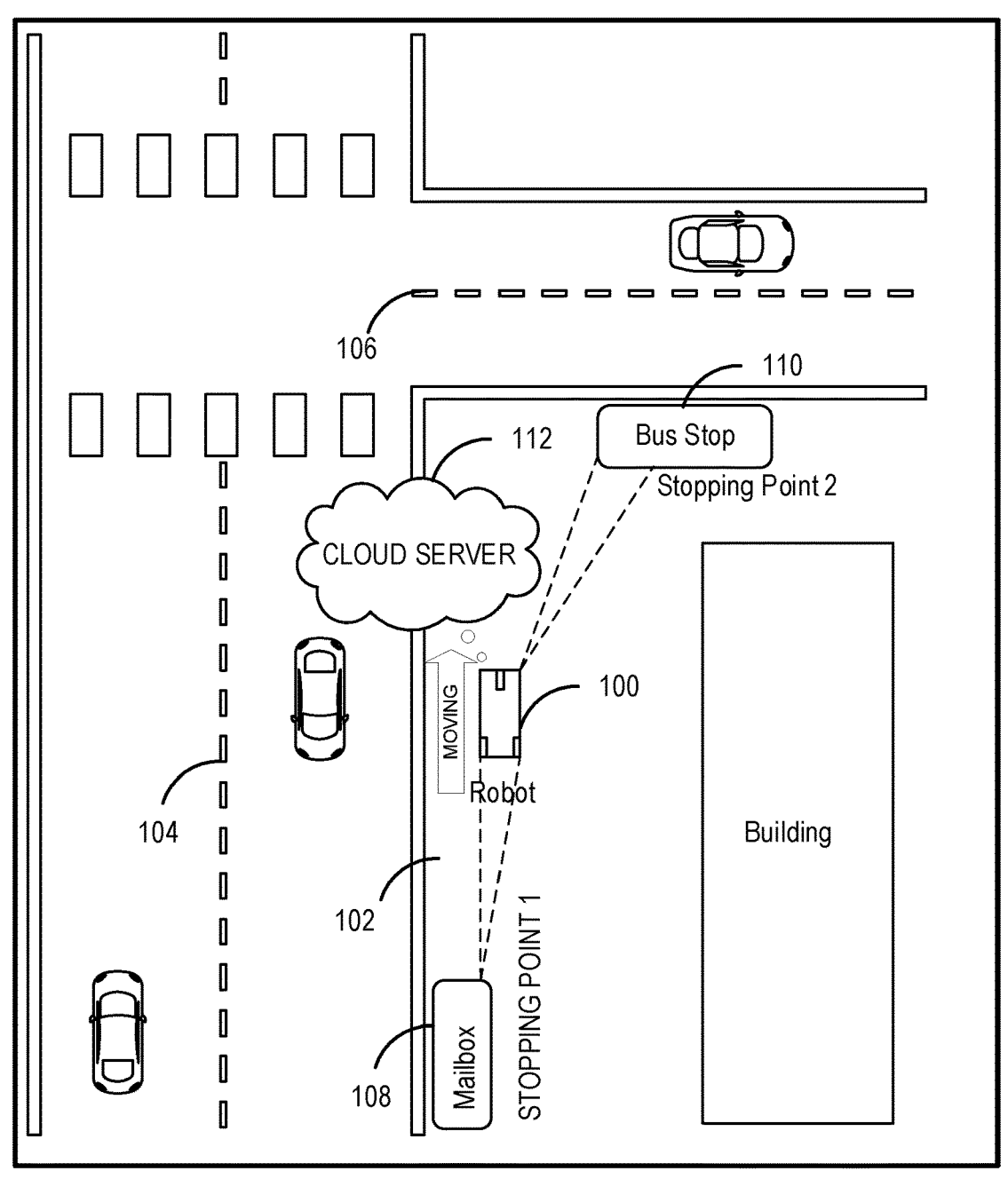
FIGS. 1A and 1B illustrate an example of a mobile robot identifying and moving to stopping points, in accordance with some embodiments.

The use of robots, such as drones or mobile robots (e.g., Autonomous Mobile Robots (AMRs), robots controlled externally with a computer system, via a human, a combination of computerized and human control, or the like) is continuously increasing. For example, mobile robots may be used for package or cargo delivery, food delivery, as mobile vending machines, or the like, and, as such, may be required to travel on, in, within, or the like, spaces used by members of the public. Such spaces may include sidewalks, pathways, boardwalks, streets, roads, or the like, or any combination thereof. With the increasing number of mobile robots being used, there is a risk that the robots may break down or become in need of repair. In some instances, a robot that has broken down or requires maintenance may still be able to travel/move around. Further, mobile robots may be subject to an electronic attack (e.g., be hacked) such that the mobile robot is moving, driving, traversing, or the like, in an unexpected manner, such as deviating from a pre-determined or programmed route, task, or the like.

Therefore, there may be certain conditions in which a mobile robot may need to stop for services such as charging (e.g., when a robot's power source, such as an onboard battery has drained due to extended operation caused by factors such as requiring use of a detour, or the like) or repairs (e.g., fixing or inflating a tire, replacing a non-functioning or faulty part, or the like). Further, a mobile robot operating in an out-of-control or unexpected manner may need to be captured, forced to stop, or the like. Thus, the mobile robot should be able to identify available stopping points at which it can stop and receive (or wait for) such services or maintenance. Additionally, a system is needed to capture and evacuate mobile robots that are operating in an unexpected or out-of-control manner.

In many cases, mobile robots are smaller sized robots (as compared to, for instance, autonomous vehicles) that may face a need to stop along its path of navigation. The mobile robots may perform environment mapping with a focus on points of interest/stopping points for stopping at, parking at, or the like, without causing a safety hazard to members of the public be they pedestrians, traveling in vehicles, riding on a bike, or the like. In an example, the stopping points are not landmark buildings such as gas stations, schools, libraries, shopping malls, rest areas, or the like, that are commonly identified by autonomous vehicles. In an example, the stopping points for the mobile robots may be locations that are not shown on traditional GPS maps, such as lamp posts, mailboxes, bicycle parking, bus stops, or the like. These points of interest/stop points/stopping points are meant to be temporary stopping points for services such as charging, maintenance, or retrieval of the mobile robots. In an example, the system may identify that a stop point/stopping point is safe for the mobile robot to stop and receive the necessary service, maintenance, or the like.

Further, in the cases where a robot requires repair but is still moving, or is out-of-control, the mobile robot may need to be stopped. Even with safety mechanisms in place, a mobile robot moving in an unexpected, erratic, unauthorized, or the like, manner may pose a hazard, threat, danger, or the like, to people or objects within its surrounding area. A mobile robot that is out of control may especially pose a threat if humans are not able to approach and disengage the mobile robot in a safe manner. Thus, a rescue system may be utilized to contain, capture, evacuate, or the like and disengage the mobile robot.

In an example, a system for controlling a mobile robot may comprise at least one processor and memory, including instructions that when executed by the processor cause the processor to determine a state of the mobile robot. In an example, the state of the mobile robot may be determined using at least one of: data provided by the mobile robot, or data provided by one or more sensors proximate to or attached to the mobile robot. In an example, the sensors may include a camera, a Radio Detection and Ranging (RADAR) sensor, a Light Detection and Ranging (LIDAR) sensor, an accelerometer, a position sensor, a pressure sensor, a vibration sensor, an infrared sensor, or the like. The instructions may further cause the processor to determine a state of an object proximate to the mobile device using the one or more sensors proximate to or attached to the mobile robot. In an example, the object may be a fixed and/or static object (e.g., a bench, a mailbox, a tree, a structure, a wall, a pole, a post, or the like), or the object may be moving such as a vehicle, a pedestrian, a bicycle, or the like. In an example, the system may determine, one or more available stopping points. The stopping points may be locations along a route, path, or the like, the mobile robot is currently traveling or is to travel, at which the robot may stop. In an example, known stopping points may be indicated on a Global Positioning System (GPS) map loaded onto, programmed into, available to, or the like, the mobile robot. As the mobile robot travels along a route (e.g., to perform a task), the mobile robot may use sensors to determine if a particular known stopping point is available, identify a new stopping point, or the like.

The system may further determine or identify a condition of the mobile robot that requires the mobile robot to stop. For example, when a mobile robot is powered by a battery, the system may determine that the mobile robot requires charging in order to complete a task. Additionally, or alternatively, the system may determine that the mobile robot requires repair (e.g., to repair a tire, to repair or replace a faulty or non-functioning sensor, or to repair any other part of the mobile robot) before the mobile robot can safely perform or complete a task. Based on a determination of the condition of the mobile robot that requires the mobile robot to stop, the system may issue a command to the mobile robot to navigate to a particular one of the one or more available stopping points. For example, the system may issue a command to the mobile robot to stop at the stopping point nearest to the mobile robot's current location. In an example, the system may issue a command to the mobile robot to stop at the nearest stopping point able to provide a specific service (e.g., charging).

In an example, the system may utilize smart learning, machine learning, a trained learning model, or the like to identify places/locations at which it is safe for a mobile robot to stop. The system may learn suitable stopping points along the path of the robot. In an example, the path may be the current path the mobile robot is programmed to travel in order to complete a task. In an example, the machine learning capabilities may be implemented with the hardware and software installed on the mobile robot itself or may be a part of a control system located remotely from the mobile robot that is communicatively coupled to the robot. In an example, the system may "memorize" the stopping points, particularly, the specific locations of the stopping points.

In an example, the presently disclosed system may differ from systems used, for example, by autonomous vehicles in a number of ways. For example, stopping points in the present system may be scanned in real-time by sensors attached to or proximate to the mobile robot, whereas stopping points for autonomous vehicles may be pre-loaded into at GPS map on the vehicle. Further, the stopping points for the mobile robots may be smaller locations, along a roadside or a walkway, whereas landmarks for autonomous vehicles are large (e.g., buildings). The stopping points/landmarks/points of interest for the mobile robots are subject to change based on circumstances such as construction, weather, obstructions, or the like. Thus, the mobile robots may need to be updated frequently in an augmented map with the changing dynamics along the roadside, sidewalk, or the like. On the other hand, stopping points/landmarks/points of interest for autonomous vehicles are more static and are not as likely to change.

Another difference between the present systems and those pertaining to autonomous vehicles, is that the stopping criteria for mobile robots under the present system are subject to real-time conditions for the stopping points, which may be judged based on safety rules, whereas autonomous vehicles generally stop in the shortest distance and shortest amount of travel time. Similarly, unexpected stopping of mobile robots under the present system can be prevented because there are generally many potential stopping points along a roadside, whereas unexpected stopping of a motor vehicle can be prevented if the remaining battery life is calculated correctly. Therefore, the present system provides the benefits of preventing small sized robots from stopping in the middle of nowhere, preventing the robots from causing a safety hazard on a walkway or roadway (especially to pedestrians), and provides safer human and robot interaction.

Figure 1B:
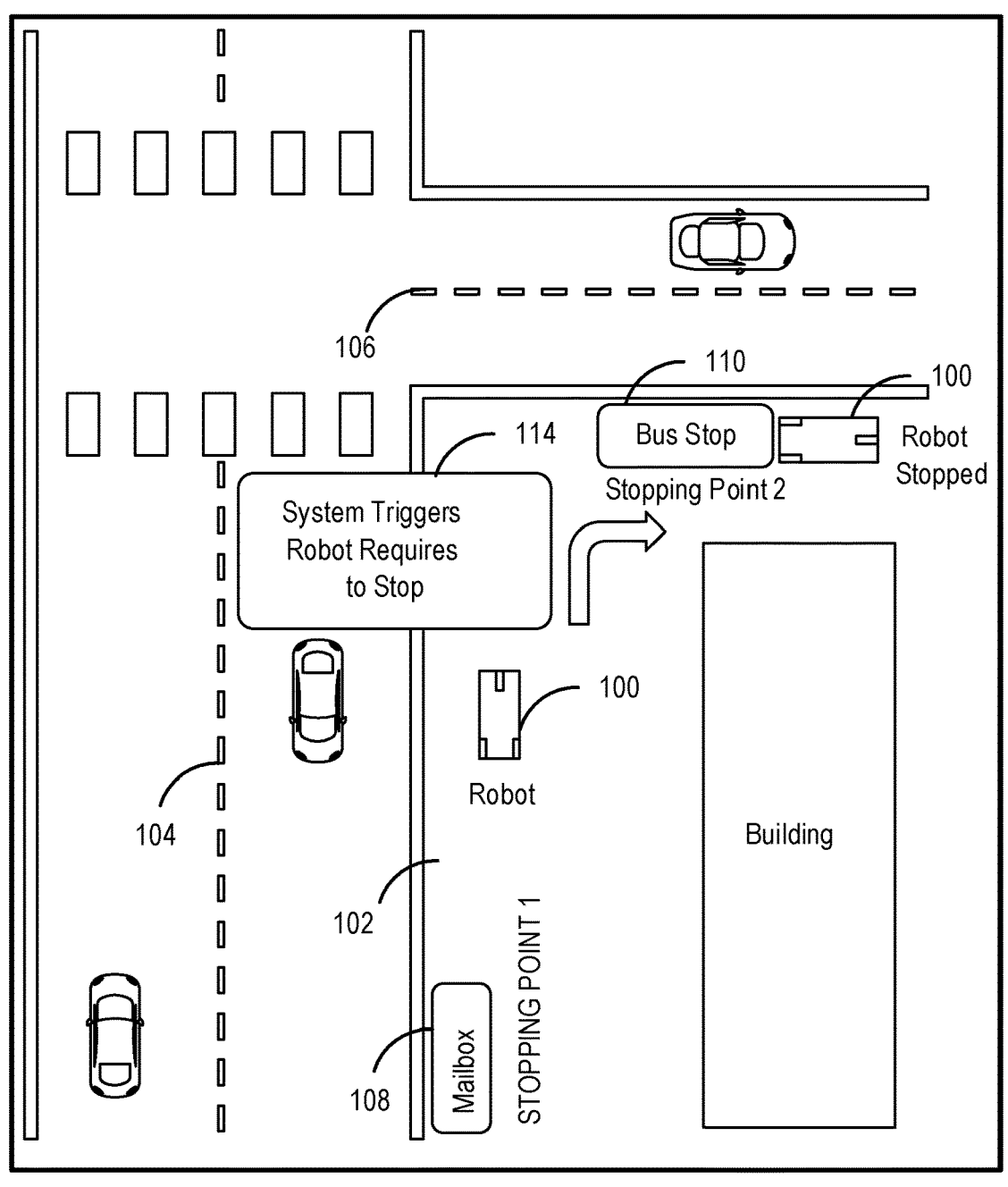

FIGS. 1A and 1B illustrate an example of a mobile robot identifying and moving to stopping points, in accordance with some embodiments. In the examples illustrated in FIGS. 1A and 1B, a mobile robot 100 may travel (e.g., in a direction indicated by the arrow in FIG. 1A) along a sidewalk 102 adjacent to streets 104 and 106. In an example, one or more sensors attached to the mobile robot 100 may scan, look, examine, search, or the like (as indicated by the dashed lines extending from the mobile robot 100 in FIG. 1A), the surroundings in which the mobile robot 100 is traveling for possible stopping points. In the example illustrated in FIGS. 1A and 1B, the result of the scan of the surrounding identifies two possible/available stopping points near the mobile robot 100. The first possible/available stopping point is mailbox 108, and the second possible/available stopping point is bus stop 110. In an example, the system may transmit, communicate, or the like, information relating to the stopping points to a cloud-based server 112. In an example, the information may include a type of the stopping point (e.g., that one of the stopping points is mailbox 108 and that the other stopping point is bus stop 110), or location information for the stopping points (e.g., coordinates for the stopping points, distance of the stopping points from a curb or other landmark, or the like) obtained in real-time by the one or more sensors attached to the mobile robot 100. In an example, the information about the stopping points communicated to the cloud-based server 112 may be transmitted from the cloud-based server 112 to other robots that are nearby or may be navigating on the same streets 104 and 106 so that the other robots may know the locations, types, and conditions of the stopping points.

As illustrated in FIG. 1B, the system may determine that the mobile robot 100 requires stopping. This may be a determination that a condition of the mobile robot 100 such as a need for the mobile robot 100 to charge, or that the mobile robot 100 needs repair, or the like, requires the mobile robot 100 to stop. In response to such a determination, the system may issue a command 114 to the mobile robot 100 to stop at a particular one of the stopping points. In an example, the particular one of the stopping points that the mobile robot is issued the command to stop at may be the closest stopping point. For example, the closest stopping point may be the closer of the mailbox 108 or the bus stop 110. In an example, the system may account for or consider factors such as travel time to and/or the presence of (or the lack of) obstacles in the path of the mobile robot 100 when determining which of the stopping points at which the mobile robot 100 should stop.

In an example, if the system determines a need for the mobile robot 100 to stop, and has either the mailbox 108 or the bus stop 110 as available stopping points, if the bus stop 110 is the closest stopping point, and there are no obstacles in the path of the mobile robot 100, the system may instruct/command the mobile robot 100 to stop at the bus stop 110, as illustrated in FIG. 1B. On the other hand, if the robot is closer to mailbox 108, but the system detects the presence of an obstacle, obstruction, or the like, between the mobile robot 100 and the mailbox 108, the system may instruct the mobile robot 100 to stop at the bus stop 110 even though it is farther away.

In an example, a previously identified available stopping points may change/be updated based on the information about the stopping points obtained by the one or more sensors attached to the mobile robot 100. For example, if the mailbox 108 had been previously identified as a stopping point along street 104, but the sensors determine that mailbox 108 has been removed, this information may be communicated to the cloud-based server 112 which may update a GPS map to remove the mailbox 108 as an available stopping point. Similarly, if a portion of the sidewalk 102 is under construction, and the mobile robot 100 cannot safely navigate to one or both of the mailbox 108 or the bus stop 110, this information may be communicated to the cloud-based server 112 and the GPS map updated to reflect that the stopping points are currently unavailable.

Stopping points may be small as compared with landmarks such as buildings that are typically detected by autonomous vehicles. Additionally, as stated above, the stopping points may change if, for example, construction work removes them, or they have been replaced by a new type of stopping point. Therefore, a mobile robot may be required to frequently monitor (via the one or more sensors attached to the mobile robot 100) its surroundings to identify stopping points as it travels along a walkway, sidewalk, street/roadway, or the like. In an example, the frequency may be constant (e.g., constant scanning using the sensors attached to the mobile robot 100) or may be less frequent, such as every thirty seconds, or any other appropriate interval. In an example, when the mobile robot 100 has a map with previously identified stopping points loaded onto it, or communicated to it, when the mobile robot 100 is traveling along a route with previously identified stopping points, the mobile robot 100 may scan the previously identified stopping points so that a determination may be made (e.g., by the robot when the robot is fully autonomous, by a controller in communication with the robot, or the like)

whether the previously identified stopping points are still available, are still safe, are of the same or different type, or the like.

Figure 2:
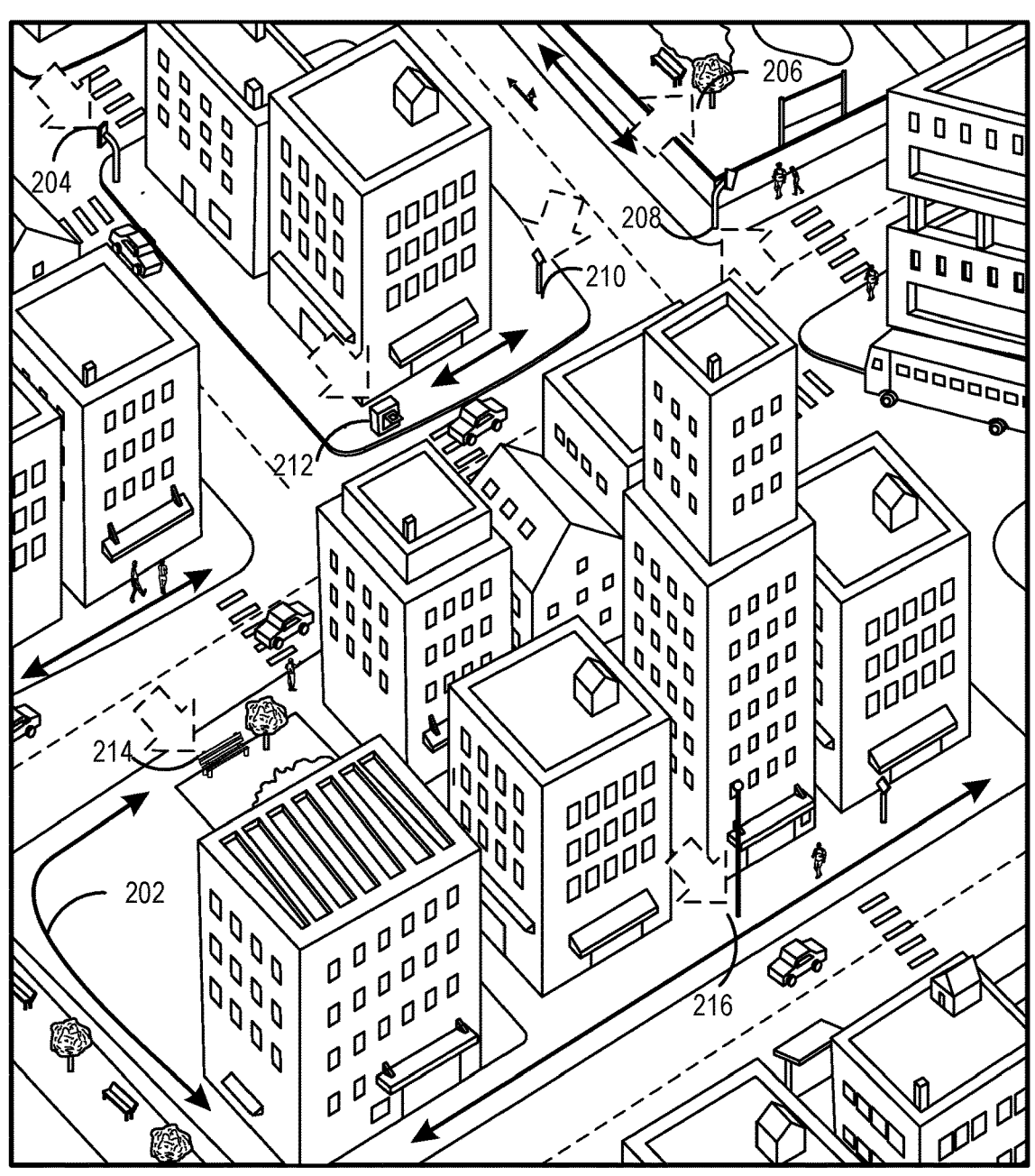
FIG. 2 illustrates an example of a street map with identified stopping points that can be identified by a mobile robot, in accordance with some embodiments.

FIG. 2 illustrates an example of a street map with identified stopping points that can be identified by a mobile robot, in accordance with some embodiments. In the example illustrated in FIG. 2, a GPS map 200 may be loaded onto, communicated to, transferred to, or the like, the mobile robot 100. The GPS map 200 may contain one or more routes 202 that the mobile robot 100 is to navigate (as depicted by the double ended arrows). In an example, the GPS map 200 may also contain a number of previously known/identified/available stopping points 204-216 (as indicated by the dashed arrows). In an example, as the mobile robot 100 travels along the one or more routes 202, the sensors attached to the mobile robot 100 may capture information, data, or the like, regarding the stopping points and communicate, transfer, or the like, the information to the cloud-based server 112. In an example, information about the stopping points may be captured, gathered, or the like, by additional sources. For example, information about the stopping points may be captured by other mobile robots operating, navigating, traveling, or the like in the same area. Also, information about the stopping points may further be captured by infrastructure-based sensors located in the area (e.g., cameras mounted on a utility pole, security cameras on a building, or the like) in which the mobile robot 100 is traveling (e.g., sensors proximate to the mobile robot 100 but not attached, mounted, or the like, on the mobile robot 100). In an example, the system may accept information/data regarding the stopping points contributed by human sources. For example, owners of property (e.g., residences, businesses, or the like) along the path/route of the mobile robot 100 may submit information, updates, or the like, regarding stopping points in the area. In an example, the information about the stopping points from the additional sources may also be communicated/transferred to the cloud-based server 112.

In an example, all of the information/data about the stopping points communicated from the various sensors to the cloud-based server 112, may be processed at the cloud-based server 112. In an example, the processed information relating to the stopping points may include updating the GPS map 200 with the information relating to the one or more stopping points captured by the one or more sensors proximate to or attached to the mobile robot 100. For example, the system may process the information and update the GPS map 200 with the information reflected in the sensor data to make any appropriate updates, when sensor data from one or more of the sensors proximate to or attached to the mobile robot 100 determines that a particular stopping point is blocked, has been removed, has changed in some way, or the like. The system may also perform such actions to indicate that a particular stopping point is no longer available and remove that stopping point from the GPS map 200, or to indicate that the stopping point has changed type, or the like.

In an example, when the information/data finishes processing at the cloud-based server 112, the processed information may be communicated from the cloud-based server 112 to the mobile robot 100. In an example, the processed information may be communicated to the mobile robot 100 in the form of an updated GPS map with safe stopping points identified as discussed below.

Figure 3A:
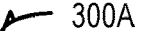
FIGS. 3A and 3B illustrate an example of identified safe stopping points and the exact locations of the safe stopping points within an augmented safe stopping point map, in accordance with some embodiments.
Figure 3B:
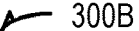

FIGS. 3A and 3B illustrate an example of identified safe stopping points and the exact locations of the safe stopping points within an augmented safe stopping point map, in accordance with some embodiments. In the example illustrated in FIGS. 3A and 3B, an augmented safe stopping point map 300A may be communicated from the cloud-based server 112 to the mobile robot 100 after the information/data regarding possible stopping points has been processed at the cloud-based server 112. In an example, during the processing of the data/information of the available stopping points 204-216 on the GPS map 200, the system may determine that at least one of available stopping points 204-216 are safe stopping points. In an example, when one or more of the available stopping points 204-216 are deemed to be unsafe, unsuitable, unavailable, or the like during the processing at the cloud-based server 112, the system may remove those stopping points, so they are not reflected on the augmented safe stopping point map 300A. In the example illustrated in FIG. 3A, all of the available stopping points 204-216 on the GPS map 200 are deemed by the system to be safe during processing and are thus included on the augmented safe stopping point map 300A as safe stopping points 302A-314A.

In an example, as a part of the processing of the stopping point information/data at the cloud-based server 112, the augmented safe stopping point map 300A may be further augmented so that exact locations of the safe stopping points 302A-314A are loaded into the further augmented safe stopping point map 300B (as indicated by the numbers in FIG. 3B). In an example, the exact locations of the safe stopping points 302B-314B may include data such as coordinates (e.g., latitude and longitude) for the safe stopping points. In an example, the exact locations of the safe stopping points 302B-314B may include information such as distance from a landmark such as a building, distance from a curb or street/roadway, or the like.

In an example, the processing of the information regarding the stopping points may include a determination of whether one or more safety rules are satisfied to the stopping points. In an example, the determination of whether the one or more safety rules are satisfied may be performed at the cloud-based server 112 or may be performed by a processor included on the mobile robot 100. In an example, one of the one or more safety rules may be an identification that the stopping point has enough space for the mobile robot 100 to stop safely. For example, a determination that there is sufficient distance/area of clearance around the stopping point (e.g., five feet) for the robot to stop. The sufficient distance around the stopping point may be determined by the dimensions of the mobile robot 100, how close the stopping point is to a sidewalk or street/roadway, an amount of traffic (e.g., pedestrian, vehicle, or the like) around the stopping point, or the like. Such a distance or area of clearance may create a "keep out zone", and upon a determination that an object is within the keep out zone, the stopping point may be determined to be unsafe, and as such not included on the augmented safe stopping point map 300A or the further augmented safe stopping point map 300B.

A second safety rule may include an "unexpected situation rule." As previously discussed, possible available stopping points, such as available stopping points 204-216 identified on the GPS map 200 may be deemed unavailable or unsafe. This may be due to situations such as construction work around the stopping point, severe weather (e.g., during a heavy snowstorm a particular stopping point may become covered with snow, or snow may prevent the mobile robot 100 from gaining access to the stopping point), or the like. Such situations may cause the system to determine a particular stopping point is temporarily unavailable or unsafe, and under those circumstances, the mobile robot 100 may be directed to, or in the case of a fully autonomous robot, look for a different stopping point.

The system may also employ a "no identified stopping point" or a "safe as possible stopping point" rule. When the mobile robot 100 encounters a situation in which it requires stopping, such as if the robot becomes damaged, but is in an area in which there are no qualified stopping points available, the system may determine the safest location for the mobile robot 100 to stop based on the processed data/information from the cloud-based server 112. In an example, the determination may be made based on factors such as safety to pedestrians, safety to vehicles, and safety to the mobile robot 100. In an example, the safe as possible stopping point may include a visible location such as a corner or façade of a building, that makes the mobile robot 100 easy to spot/find, while avoiding locations such as entrances to buildings or parking lots, walkways, or handicapped access points. In an example, the safe as possible stopping points are not areas that would normally be identified as an available stopping point but are only used if no other stopping points are available for a reason such as that the mobile robot 100 would violate the unexpected situation rule or the keep out zone rule or would be deemed unsafe/unavailable for any other reason. In an example, at least one of the augmented safe stopping point map 300A or the further augmented safe stopping point map 300B may be communicated, transmitted, or the like from the cloud-based server 112 to the mobile robot 100, or to multiple robots being controlled by the system that may be operating, traveling, or the like (or may be scheduled to do so) in the area.

Figure 4A:
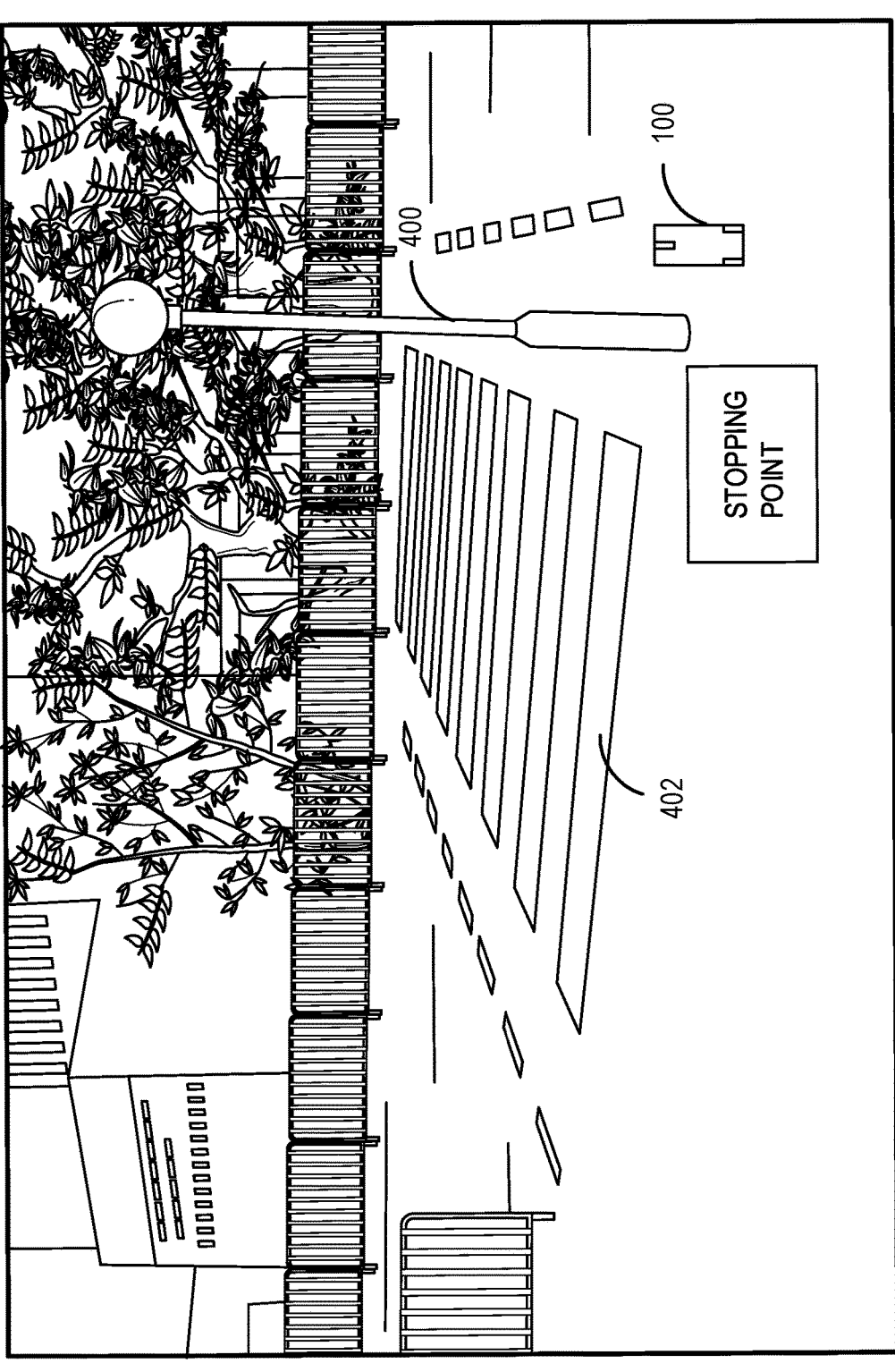
FIGS. 4A and 4B illustrate examples of safe stopping points for a mobile robot, in accordance with some embodiments.
Figure 4B:
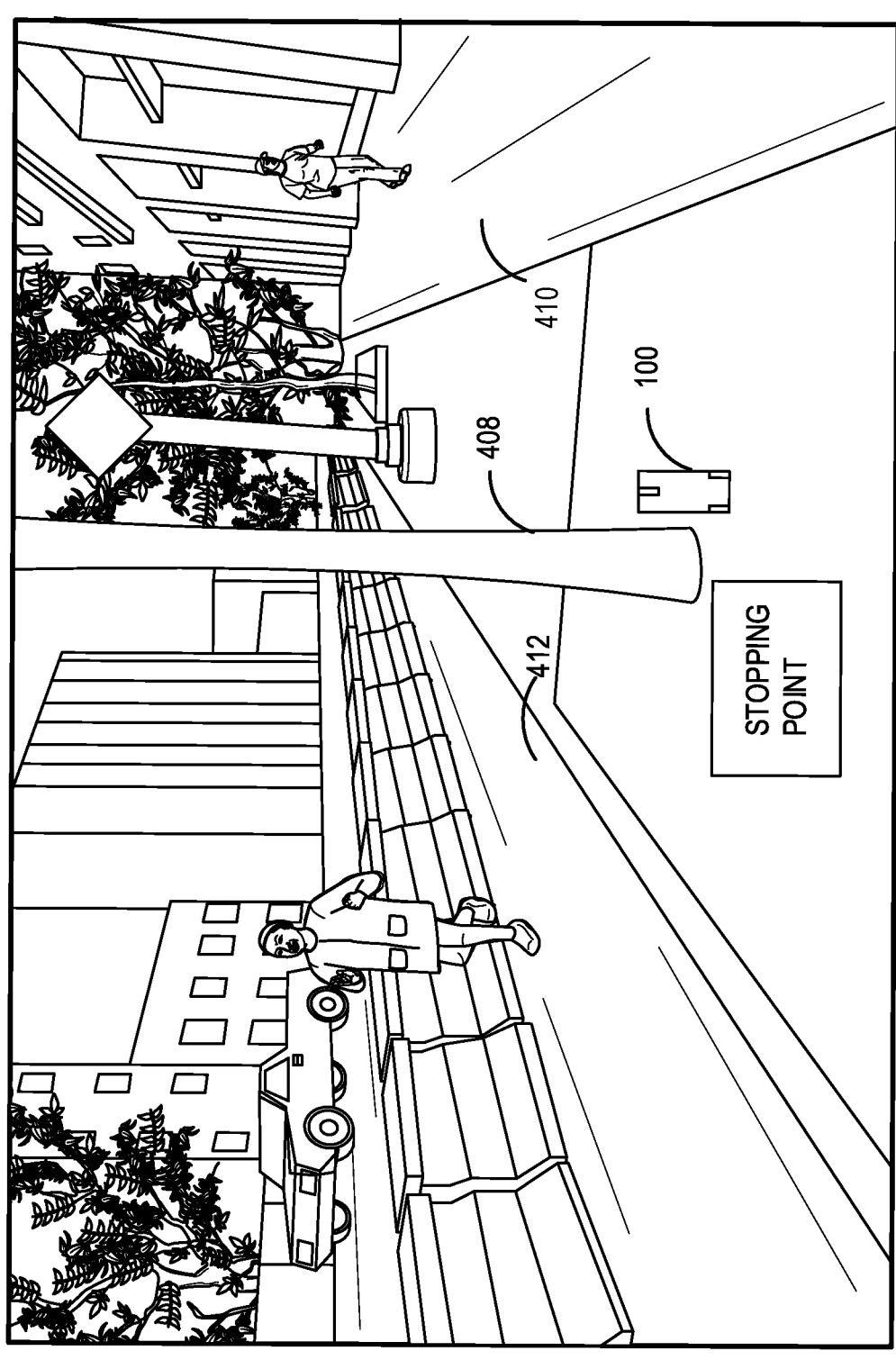

FIGS. 4A and 4B illustrate examples of safe stopping points for a mobile robot, in accordance with some embodiments. In the examples illustrated in FIGS. 4A and 4B, the mobile robot 100 may stop at locations deemed safe after the processing of the stopping point data/information as discussed above, because of a condition or conditions set, caused, or the like, by one or more of the safety rules. As illustrated in FIG. 4A the mobile robot 100 may stop at a location near a pole 400 adjacent to a crosswalk 402. In an example, the mobile robot 100 may stop next to the pole 400 on a side of the pole 400 so as to not obstruct, impede, block, or the like the crosswalk 402. In an example, the system may instruct the mobile robot 100 to align, orient, park, locate, or the like, itself in relation to the pole 400 so as not to impede pedestrians in the crosswalk 402, or walking on the sidewalk 404, or vehicles traveling on the street 406. In an example, when the mobile robot 100 is a fully autonomous robot, the mobile robot 100 may determine the best, most convenient, safest place, location, or the like, to navigate to and to stop with respect to the pole 400 to prevent damage to itself and prevent damage or injury to people or property in the area.

The example of FIG. 4B illustrates the mobile robot 100 stopped, parked, or the like, near a tree 408 adjacent to another sidewalk 410 and a walking/jogging lane 412. In an example, the mobile robot 100 may park, stop, or the like (again as instructed by the system or as determined on its own) in an area next to the tree 408 so as not to be on or in the sidewalk 410 or the walking/jogging lane 412. In an example, the system and/or the robot may determine a minimum distance from the sidewalk 410 and the jogging lane 412 where the mobile robot 100 may safely stop, where the risk of damage to the mobile robot 100 or inconvenience, injury, harm, damage, or the like, to people or property in the vicinity of the tree 408 may be reduced, minimized, eliminated, or the like.

Figure 5:
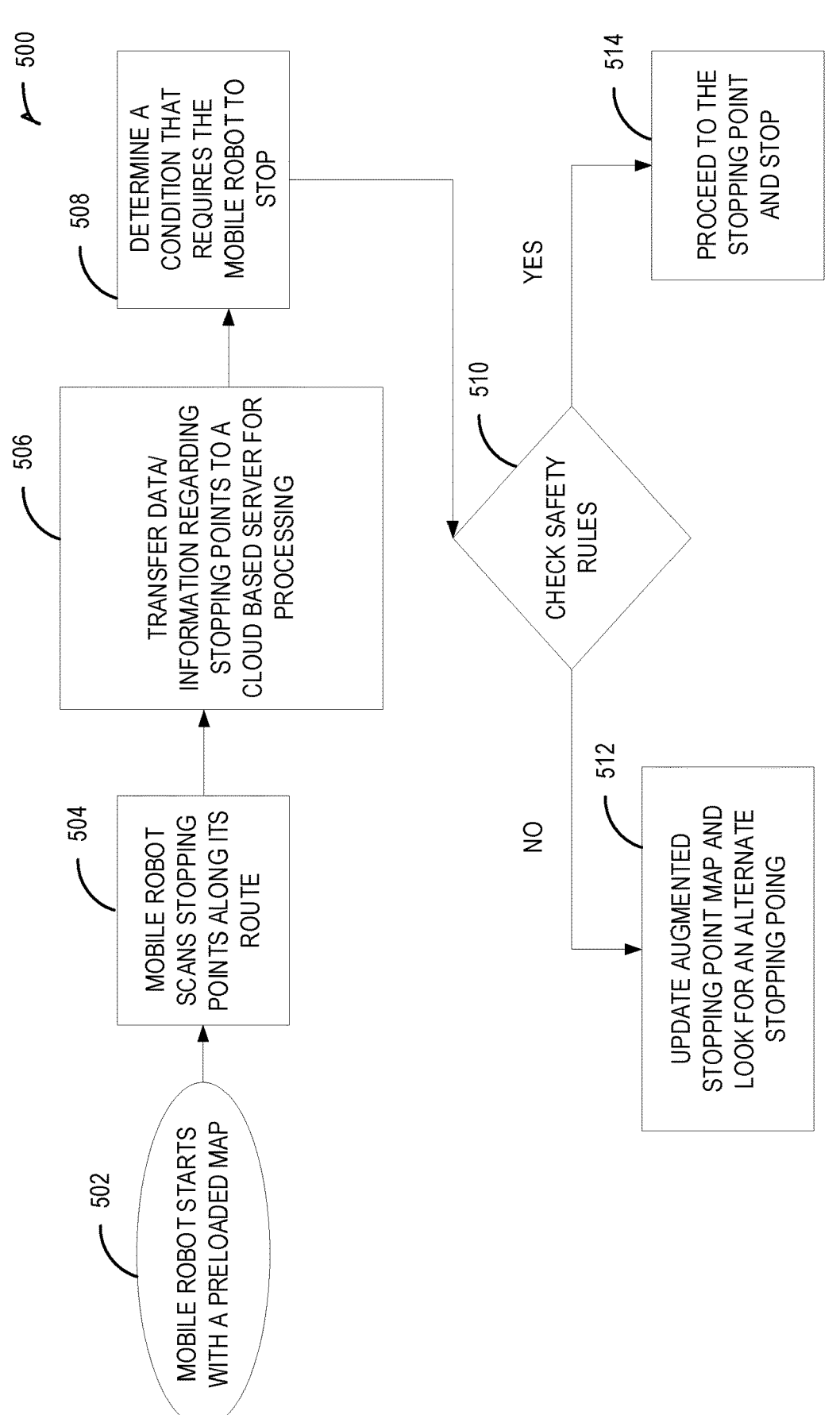
FIG. 5 illustrates an example of a flow diagram for identification of safe stopping points, in accordance with some embodiments.

FIG. 5 illustrates an example of a flow diagram 500 for identification of safe stopping points, in accordance with some embodiments. At Operation 502, the mobile robot 100 may begin a route, task, job, or the like with a pre-loaded map, such as GPS map 200. This map may contain landmarks such as buildings, streets/roadways, sidewalks, or the like along the route the mobile robot 100 is to travel, navigate, or the like. The map may also have several potential/possible stopping points/points of interest loaded into it. In an example, the potential stopping points may be previously identified, previously available, or previously used stopping points determined by the mobile robot 100 (or a different robot, drone, or the like) during a previous mission, task, job, or the like.

At Operation 504, the mobile robot 100 may scan its environment, using sensors such as one or more cameras, one or more RADAR sensors, one or more LIDAR sensors, or the like, attached to the mobile robot 100 along the walkway, sidewalk, street, road, or the like on which the mobile robot 100 is traveling. This scan may be used to identify whether a previously identified stopping point near the present location the mobile robot 100 is still available, accessible, safe to use, or the like, or may be to determine if a new stopping point along the route can be identified, is available, or the like. In an example, information/data regarding previously available or new stopping points may also be gathered, collected, or the like, form other sensors not attached to the mobile robot 100 such as cameras located on buildings or infrastructure (e.g., poles, bus stop shelters, or the like) along the path the mobile robot 100 is traveling. In an example, information/data regarding previously available or new stopping points may also be collected, gathered, or the like from other autonomous robots (e.g., drones, other mobile robots, or the like) that have previously traveled or are currently traveling along the same or similar route or in the same area as the mobile robot 100. In an example, the information/data may include distance of the stopping points to an adjoining or adjacent street, road, sidewalk, walkway, path, or the like. Further, the information/data may include distance from an object. In an example, the object may be a static object such as a bench, garbage can, wall, building, or the like, or the object may be dynamic/moving objects such as people, animals, bicycles, scooters, or any type of vehicle or mobile/moving object. In an example, the information/data about the stopping point may include an amount of clear or unused space around the stopping point.

At Operation 506, the information/data about the stopping points collected from the sensors in Operation 504 may be transferred, communicated, or the like, to a cloud based server such as cloud-based server 112 for processing. The processing may include a determination that a particular stopping point is not accessible to the mobile robot 100, a determination that a particular stopping point has changed (e.g., the type of stopping point has changed), a determination that a particular stopping point has been removed, or the like. In an example, the processing may further determine whether a particular stopping point (or a potential stopping point) is accessible to the mobile robot 100 pursuant to one or more of the safety rules discussed above. In an example, the processing may include a calculation of a distance of the stopping point from the mobile robot 100, a distance of the stopping point from a street/roadway or sidewalk, and/or a determination of the presence of an object between the mobile robot 100 and the stopping point.

Operation 506 may further include creating an augmented stopping point map based on the processed information/data and communicating the augmented stopping point map to the mobile robot 100. In an example, the augmented stopping point map may be communicated to any or all robots connected to the cloud-based server 112. In an example, the augmented stopping point map may update the GPS map 200 to display one or more stopping points deemed safe, accessible, available, or the like, based on the information/data transferred from the sensors attached to or proximate to the mobile robot 100 and the processing of the information/data at the cloud-based server 112. In an example, the augmented map may display only stopping points deemed safe, accessible, available, or the like. In an example, the augmented map may display all stopping points, but mark or otherwise indicate certain stopping points are not available, not accessible, are unsafe, or the like.

Operation 508 may include a determination of a condition that requires the mobile robot 100 to stop. In an example, the condition may be a need for the mobile robot 100 to charge (when the mobile robot 100 is electric/battery powered) or is low on fuel (when the mobile robot 100 is powered by a combustion engine). In an example, the condition may be needed maintenance. For example, when a part or portion of the mobile robot 100 is broken, destroyed, becomes non-functional, or the like. In an example, the condition may be one that prevents the robot from navigating or functioning correctly such as a flat tire, a non-functioning sensor, a broken part or component, or the like. In response to a determination of the condition that requires the mobile robot 100 to stop, the system may issue a command to the mobile robot 100 to navigate to a particular one of the stopping points indicated/deemed to be safe, accessible, available, or the like. In an example, the command may instruct the mobile robot 100 to navigate/travel to the closest available stopping point. In an example, the command may instruct the mobile robot 100 to navigate to the nearest available stopping point at which a particular service is available. For example, if a determination is made that the mobile robot 100 needs to stop in order to charge its battery, the command may instruct the mobile robot 100 to travel to the nearest stopping point with a charging station, even when there are closer stopping points available.

At Operation 510, the system may check the available stopping points against the safety rules described above. In an example, this may be a second or a supplemental check that the possible stopping points to which the mobile robot 100 may be directed to is still available, safe, or the like, for the mobile robot 100 to stop at. For example, the system may cause the sensors of the mobile robot 100 or the alternate/other sensor located in the area to collect data/information for the particular possible stopping points the mobile robot 100 may be instructed to stop at by the command issued at Operation 508 to determine, in real-time, whether the possible stopping points still meet the safety criteria.

In an example, in response to a determination that a particular stopping point does not satisfy/meet the safety criteria, and that the mobile robot 100 does not require an emergency stop (e.g., must stop immediately), the system may at Operation 512 update the augmented map using the real-time data/conditions for the particular stopping point, and look for, and cause the mobile robot to travel to, an alternate (e.g., a safer) stopping point. In an example, in response to a determination that the particular stopping point does not satisfy/meet the safety criteria, and a determination that the mobile robot 100 does require an emergency stop, the system may instruct the mobile robot 100 (or the mobile robot 100 may determine when it is fully autonomous) to stop as close to the particular stopping point as possible (e.g., get as close to the particular stopping point as the mobile robot 100 safely can) to await evacuation or repair.

In an example, at Operation 514, in response to a determination that the particular stopping point conforms to/satisfies/meets the safety criteria, if the mobile robot 100 is fully autonomous, the mobile robot 100 may proceed to stop at the particular stopping point. When the mobile robot 100 is not fully autonomous, the system may instruct the mobile robot 100 to stop at the particular stopping point.

As explained above, the system may determine a state of the mobile robot 100 and a condition of the mobile robot 100 that requires the mobile robot 100 to stop. In an example, the state of the mobile robot 100 may include at least one of: a dimensional measurement of the mobile robot 100, a speed of the mobile robot 100 (e.g., a current speed), a current route of the mobile robot 100, a current direction of the mobile robot 100 a condition of a manipulator arm attached to the mobile robot 100, or a state of a load attached to the mobile robot 100. In an example, the determination of a condition of the mobile robot 100 that requires the mobile robot 100 to stop, may include a determination that the mobile robot 100 is failing to follow a specified path, operating over a specified speed, and/or is operating less than a specified distance from the object proximate to the mobile robot 100. Therefore, the system may use the information about the state of the mobile robot 100 and, based on what the mobile robot 100 should be doing (e.g., where the mobile robot 100 should be traveling, how fast the mobile robot 100 should be going, the distance the mobile robot 100 should be maintaining from objects), determine whether a condition exists that requires the mobile robot 100 to stop. In an example, this may include a determination of whether the mobile robot 100 is operating in an out of control manner, such as not following an expected route/path, moving faster than it should for the conditions the mobile robot 100 is traveling in (e.g., a busy sidewalk or street/roadway, versus a sidewalk or street/roadway with little to no traffic, traveling in clear weather versus snow or rain, or the like), is getting too close to objects such as vehicles or pedestrians, or the like.

In an example, the system for controlling mobile robots may include an anomaly/out-of-control detection system to implement an automated, fast response system in response to the mobile robot 100 operating in an uncontrolled manner, which can present a hazard/danger to people or property near an out-of-control robot. The system may employ one or more mobile rescue/evacuation devices that may safely approach an out of control mobile robot without requiring humans risking injury and serve as a last resort safety system when other systems have failed or cannot otherwise be implemented (e.g., a command to stop at a stopping point is ignored by the mobile robot 100 or cannot be communicated to the mobile robot 100). In an example, the mobile rescue device may be a specialized platform onto which the out-of-control mobile robot may drive (or be directed/forced) onto. In an example, the mobile rescue/evacuation device may work in conjunction with one or more other mobile robots (e.g., the other mobile robots may block or impede the path of the out of control mobile robot, to help direct/force the out of control mobile robot onto the platform of the mobile rescue/evacuation device) to capture the out-of-control mobile robot. In an example, such a mobile rescue/evacuation device may work independent of the out-of-control mobile robot and thus not be affected by the root cause of the loss of control of the out-of-control mobile robot.

Figure 6:
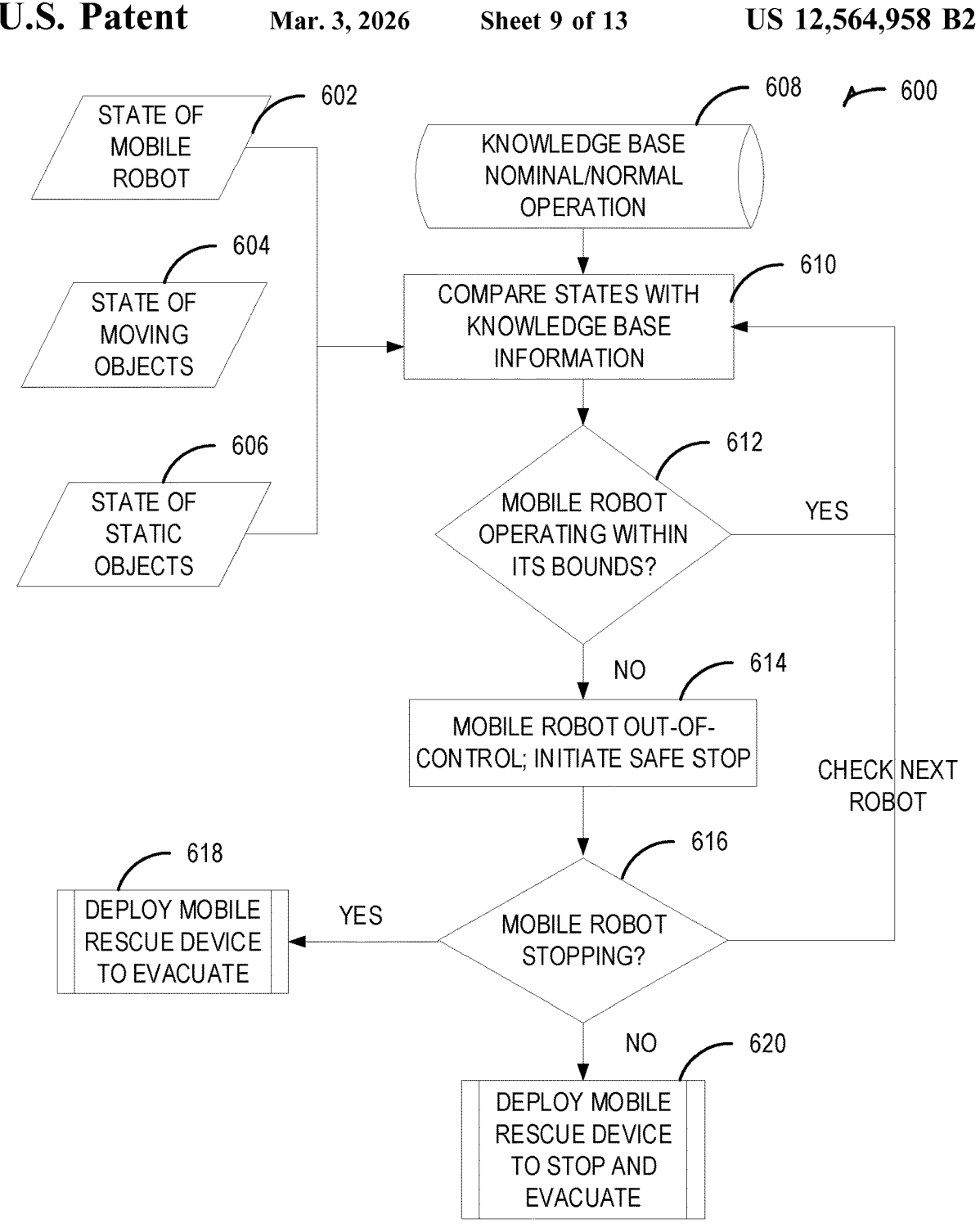
FIG. 6 illustrates a flow diagram for an out-of-control detection system, in accordance with some embodiments.

FIG. 6 illustrates a flow diagram 600 for an out-of-control detection system, in accordance with some embodiments. In the example, at Operation 602, the system may determine a state of the mobile robot 100. The state of the mobile robot 100 may be determined based on at least one of: data about the mobile robot 100, data sent from the mobile robot 100 (e.g., data from one or more sensors attached to the mobile robot 100), or data captured by one or more sensors proximate to the mobile robot 100 but not attached to the mobile robot 100 (e.g., sensors attached to buildings or infrastructure in the area the mobile robot 100 is traveling), or a combination thereof.

In an example, the out-of-control detection system may receive and/or estimate a current location, dimensions, and speed of the mobile robot 100, a current task/mission of the mobile robot 100, and a target position/route of the mobile robot 100. The system may also receive information about a configuration of an attached arm/manipulator attached to the mobile robot 100 (e.g., the arm is extended and unable to retract), and the state of a load attached to the mobile robot 100 (e.g., if packages, equipment, or other material is being hauled, transported, carried, or the like by the mobile robot 100). Thus, the system may be able to determine how large the mobile robot 100 is, how fast the mobile robot 100 is traveling, and where the mobile robot 100 is programmed, tasked, or the like, to go.

At Operation 604, the system may determine a state of moving objects proximate to or near the mobile robot 100. In an example, the moving objects may be people, vehicles, animals, other robots, or the like. At Operation 606, the system may determine a state of static objects proximate to or near the mobile robot 100. The static objects may include objects such as walls, machines, racks, containers (e.g., garbage cans), buildings, benches, shelter structures (e.g., bus stop shelters), or the like. In an example, the data/information on the static and/or the moving objects may be collected by the sensors attached to the mobile robot 100 or sensors proximate to the mobile robot 100 as discussed above. The information/data about the objects may include one or more of: object type, object location, object dimensions, and for moving objects, speed and direction.

The system may contain or be connected to a knowledge base of nominal/normal operation 608. In an example, the knowledge base of normal operation 608 may include information regarding how the mobile robot 100 should be operating, including one or more of: what path the mobile robot 100 is allowed to take, areas the mobile robot 100 is not allowed to enter, what speed and/or acceleration the mobile robot 100 should operate at, or the like. In an example, the speed or acceleration the mobile robot 100 should operate at may depend on where the mobile robot 100 is traveling, the weather conditions the mobile robot 100 is traveling in, or the like. The knowledge base of normal operation 608 may further contain information about distance the mobile robot 100 should keep from moving objects or static objects, and under what conditions a manipulator/arm attached to the mobile robot 100 may be deployed, used, extended, or the like. For example, when the mobile robot 100 is in motion, the manipulator/arm may be required to remain in a "rest", "parked", un-extended, closed, retracted, or the like, position.

In an example, information/data about at least one of: the state of the mobile robot, the state of the moving objects, or the state of the static objects collected at 602-606 may, at 610, be compared against the information in the knowledge base of normal operation 608, and at 612 determine whether the mobile robot 100 is operating within its bounds of normal operation. In response to a determination that the mobile robot 100 is operating within its bounds of normal operation, the system may return to 610 and continue to compare the information/data collected at 602-606 (which may be updated as the mobile robot 100 travels) with the information in the knowledge base of normal operation 608.

In response to a determination that the mobile robot 100 is not operating within its normal bounds, at Operation 614, the system may determine the mobile robot 100 is out-of-control (e.g., a condition that requires the mobile robot 100 to stop) and trigger a command for the robot to stop. The command may be triggered remotely, and may command, instruct, or the like, the mobile robot 100 to navigate to a particular one of the one or more available stopping points on the augmented map and may include providing at least one of: an updated task, and updated route, or an updated direction to the mobile robot 100.

In an example, at 616, the system may determine whether the mobile robot 100 is stopping (e.g., determine whether the mobile robot 100 is reacting to the command to stop). Responsive to a determination that the mobile robot 100 is reacting to the command, and a determination that the mobile robot 100 has stopped at the particular one of the one or more stopping points, at Operation 618, the system may trigger/cause a mobile rescue device to be deployed to evacuate the mobile robot 100 from the particular one of the one or more stopping points or to repair the mobile robot 100 at the particular one of the one or more stopping points. In an example, in response to a determination that the mobile robot 100 is not reacting to the command (e.g., not stopping), the system may, at Operation 620 trigger/cause a mobile rescue device to be deployed to stop and evacuate the mobile robot 100.

In an example, at 616, when the system checks to determine if the mobile robot 100 has stopped, when the system controls more than one mobile robot (e.g., a fleet of mobile robots), the system may check additional mobile robots in operation by collecting state information for the other mobile robots, collecting information about the states of objects near the other mobile robots, and determining if the other mobile robots are operating within their bounds, as detailed in FIG. 6. It is understood that the system may perform the operations/steps detailed in FIG. 6 for as many mobile robots as desired.

Figure 7:
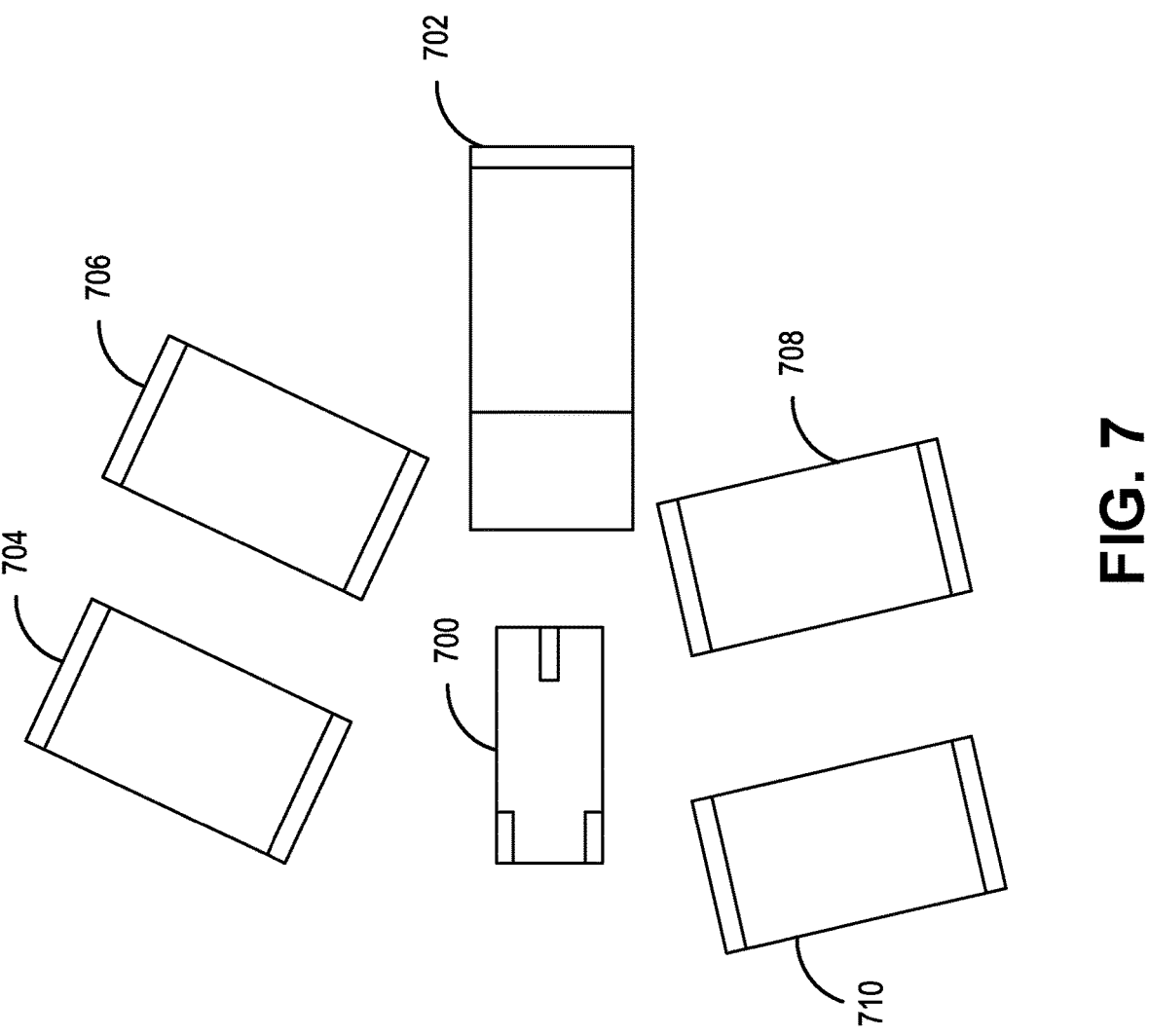
FIG. 7 illustrates an example of mobile rescue devices used to stop and evacuate an out-of-control mobile robot, in accordance with some embodiments.

FIG. 7 illustrates an example of mobile rescue devices used to stop and evacuate an out-of-control mobile robot, in accordance with some embodiments. In an example, the mobile rescue devices discussed above may be additional mobile robots, similar to mobile robot 100. In an example, the rescue devices may be fully autonomous mobile robots or operator controlled/supported. In the example illustrated in FIG. 7, an out-of-control mobile robot 700 may be evacuated by one or more mobile rescue devices 702-710. In an example, the out-of-control mobile robot 700 may be unable to stop because it is broken (e.g., the brakes on the out-of-control mobile robot 700 may be non-functional), because the out-of-control mobile robot 700 is not receiving or responding to a stop command/instruction, or the like. In an example, the one or more mobile rescue devices 702-710 may be deployed such as to drive to, navigate to, or the like, the area where the out-of-control mobile robot 700 is currently located or currently traveling. The one or more mobile rescue devices 702-710 may be deployed via a notification from the system that the out-of-control mobile robot 700 is not responding to the stop command. The notification may include an instruction/command to the one or more mobile rescue devices 702-710 to navigate to the area in which the out-of-control mobile robot 700 is traveling. The notification may also include an exact location, a last known location, or the like, for the out-of-control mobile rescue device 700 in the area.

In response to the notification, the one or more mobile rescue devices 702-710 may travel to the area and locate the out-of-control mobile robot 700 and position themselves within an anticipated future path of the out-of-control mobile robot 700, so as to block or impede the path of the out-of-control mobile robot 700. Thus, the one or more mobile rescue devices 702-710 may determine a location (e.g., an optimal location, most convenient location, safest location, or the like) to stop the out-of-control mobile robot 700 or perform an evacuation maneuver on the out-of-control mobile robot 700. The, mobile rescue device 702 may be a mobile rescue device transport platform, which can position itself in front of the out-of-control mobile robot 700 and allow the out-of-control mobile robot 700 to drive onto it, and then evacuate the out-of-control mobile robot 700 (e.g., bring the out-of-control mobile robot 700 to a repair station, workshop, or the like) from the area. In an example, one or more of the mobile rescue devices 702-710 may have one or more sensors mounted to, attached to, or the like, a portion of their structure, and may transmit, communicate, or the like, data/information to the system (e.g., to the cloud-based server 112) to improve the state estimates of the out-of-control mobile robot 700 or the objects around the out-of-control mobile robot 700. In an example in which the control system and/or the out-of-control detection system uses trained machine-learning or artificial intelligence, the information/data transmitted/communicated from the one or more of the mobile rescue devices 702-710 may be used to train the machine-learning model/system.

Figure 8:
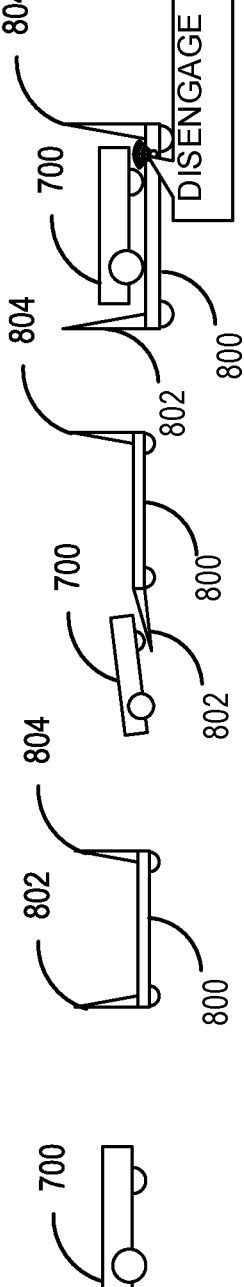
FIG. 8 illustrates an example of a mobile rescue device utilizing contactless disengagement of an out-of-control mobile robot, in accordance with some embodiments.

FIG. 8 illustrates an example of a mobile rescue device utilizing contactless disengagement of an out-of-control mobile robot, in accordance with some embodiments. In the example illustrated in FIG. 8, a mobile rescue device, which may be a mobile rescue device transport platform 800 may include one or more walls, gates, or the like, such as gate 802 and gate 804. In an example, gate 802 may be designed and configurable to be lowered such as to create a ramp onto which out-of-control mobile robot 700 may drive up/onto, at which point gate 802 may be raised back into an upright position such as to block, trap, or the like the out-of-control mobile robot 700 onto the mobile rescue device transport platform 800.

Once the out-of-control mobile robot 700 is on the mobile rescue device transport platform 800, the system may employ, use, or the like, means to disengage the out-of-control mobile robot 700. In an example, the means to disengage the out-of-control mobile robot 700 may be triggering a contactless magnetic, Near Field Communication (NFC), wireless, or the like, power switch or stop switch located below (e.g., on an underside of) the out-of-control mobile robot 700 in order to turn off, cut power to, or the like, the out-of-control mobile robot 700. In an example, the system may transmit a wireless signal to the out-of-control mobile robot 700 (e.g., using a wireless transmitter on the mobile rescue device transport platform 800) to turn off the out-of-control mobile robot 700.

Figure 9:
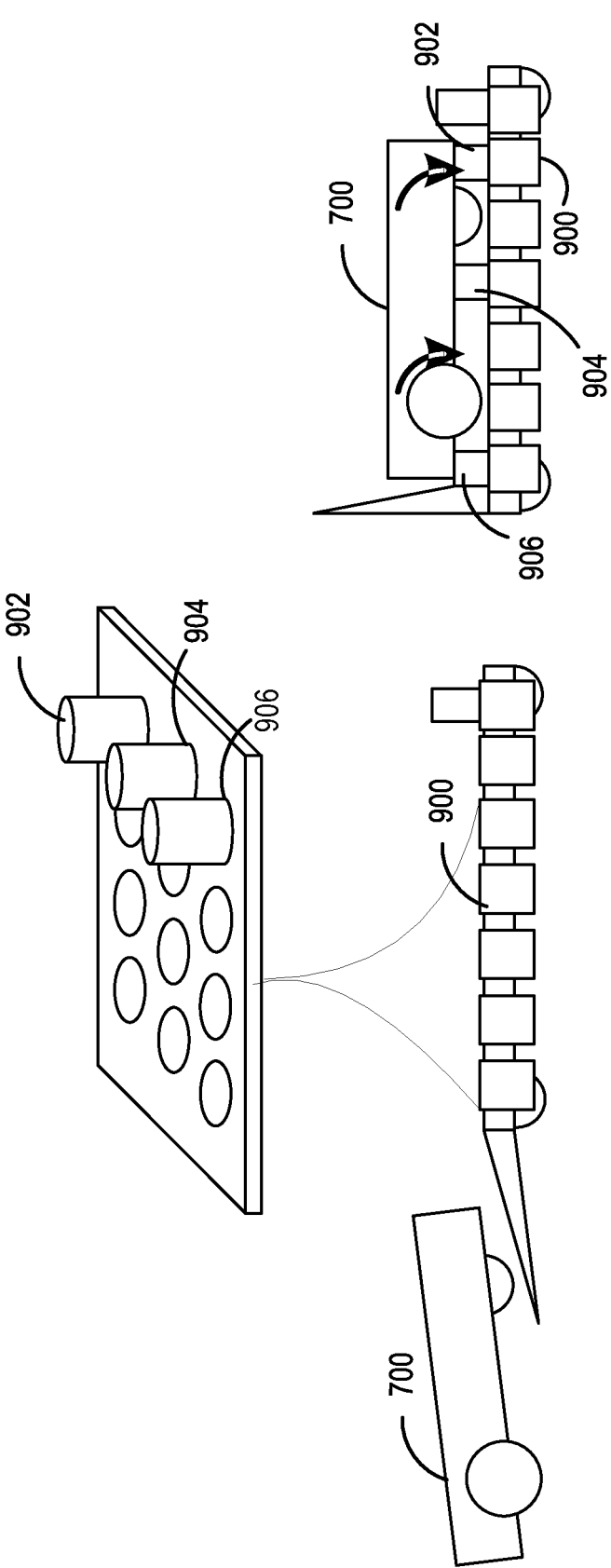
FIG. 9 illustrates an example of a mobile rescue device utilizing mechanical disengagement of an out-of-control mobile robot, in accordance with some embodiments.

FIG. 9 illustrates an example of a mobile rescue device utilizing mechanical disengagement of an out-of-control mobile robot, in accordance with some embodiments. In an example, when the out-of-control mobile robot 700 cannot be disengage in a contactless manner as described above, an alternate mobile rescue device transport platform 900 may be used to capture the out-of-control mobile robot 700. In an example, the alternate mobile rescue device transport platform 900 may deploy lifting cylinders 902-906 which may rise from the base/platform of the alternate mobile rescue device transport platform 900 (as shown in the overhead view of the platform). This may cause the out-of-control mobile robot 700 to be lifted off of the alternate mobile rescue device transport platform 900 so that the wheels of the out-of-control mobile robot 700 may be raised and allowed to spin without the out-of-control mobile robot 700 being able to move any further. This may prevent the out-of-control mobile robot 700 from falling over, damaging the alternate mobile rescue device transport platform 900, driving off the alternate mobile rescue device transport platform 900, or the like. Then, the alternate mobile rescue device transport platform 900 may transport the out-of-control mobile robot 700 to a repair station or repair workshop as discussed above. The alternate mobile rescue device transport platform 900 may have multiple lifting cylinders such as 902-906 that can be deployed in whatever configuration is required to lift the out-of-control mobile robot 700 off the base of the alternate mobile rescue device transport platform 900.

Figure 10:
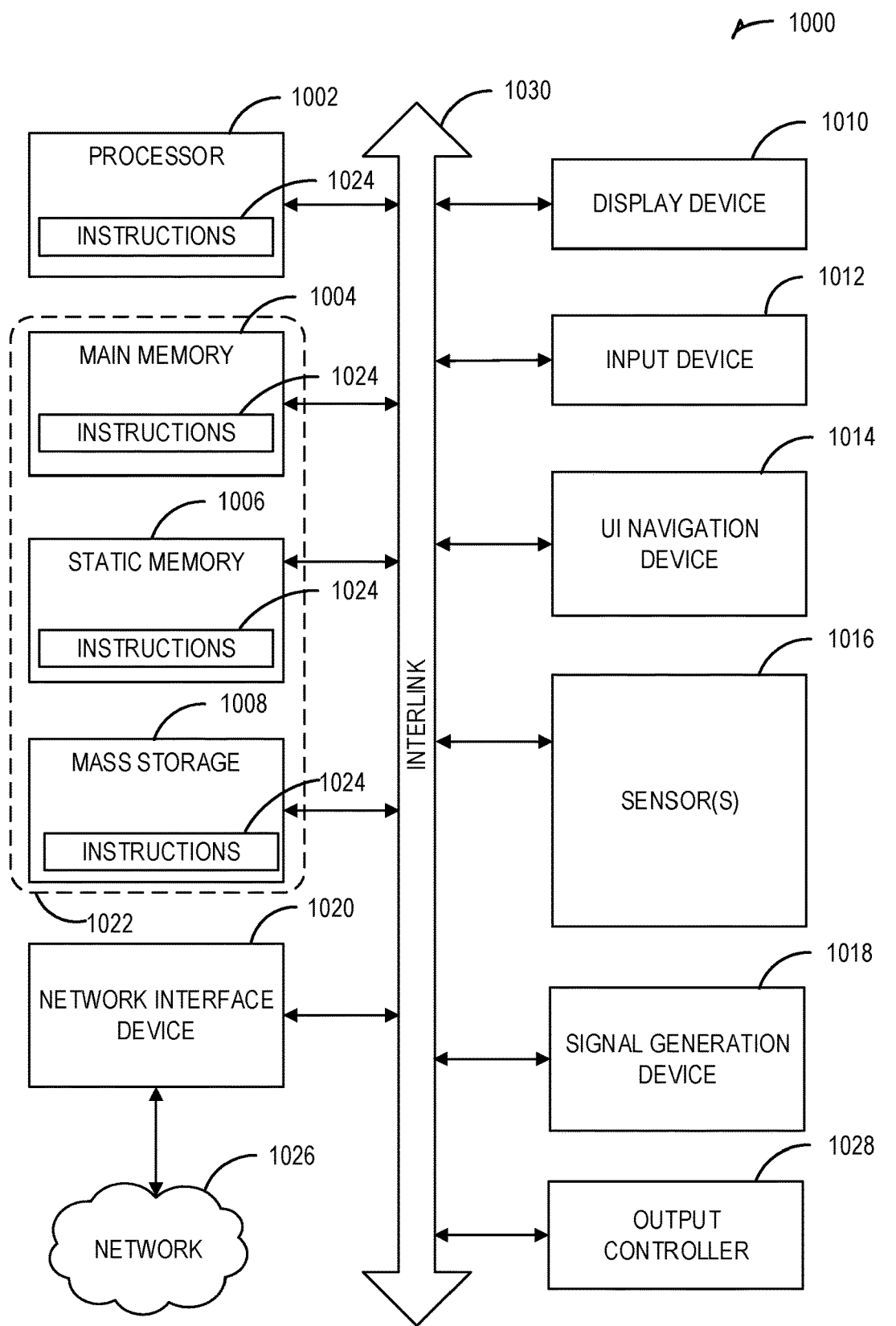
FIG. 10 is a block diagram illustrating an example of a machine upon which one or more embodiments may be implemented.

FIG. 10 illustrates a block diagram of an example machine 1000 upon which any one or more of the techniques (e.g., methodologies) discussed herein may perform. In alternative embodiments, the machine 1000 may operate as a standalone device or may be connected (e.g., networked) to other machines. In a networked deployment, the machine 1000 may operate in the capacity of a server machine, a client machine, or both in server-client network environments. In an example, the machine 1000 may act as a peer machine in peer-to-peer (P2P) (or other distributed) network environment. The machine 1000 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 1000 may include a hardware processor 1002 (e.g., a central processing unit (CPU), a graphics processing unit (GPU), a hardware processor core, field programmable gate array (FPGA), or any combination thereof), a main memory 1004 and a static memory 1006, some or all of which may communicate with each other via an interlink (e.g., bus) 1008. The machine 1000 may further include a display unit 1010, an alphanumeric input device 1012 (e.g., a keyboard), and a user interface (UI) navigation device 1014 (e.g., a mouse). In an example, the display unit 1010, input device 1012 and UI navigation device 1014 may be a touch screen display. The machine 1000 may additionally include a storage device (e.g., drive unit) 1016, a signal generation device 1018 (e.g., a speaker), a network interface device 1020, and one or more sensors 1021, such as a global positioning system (GPS) sensor, compass, accelerometer, or other sensor. The machine 1000 may include an output controller 1028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1016 may include a machine readable medium 1022 on which is stored one or more sets of data structures or instructions 1024 (e.g., software) embodying or used by any one or more of the techniques or functions described herein. The instructions 1024 may also reside, completely or at least partially, within the main memory 1004, within static memory 1006, or within the hardware processor 1002 during execution thereof by the machine 1000. In an example, one or any combination of the hardware processor 1002, the main memory 1004, the static memory 1006, or the storage device 1016 may constitute machine readable media.

While the machine readable medium 1022 is illustrated as a single medium, the term "machine readable medium" may include a single medium or multiple media (e.g., a centralized or distributed database, and/or associated caches and servers) configured to store the one or more instructions 1024.

The term "machine readable medium" may include any medium that is capable of storing, encoding, or carrying instructions for execution by the machine 1000 and that cause the machine 1000 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1024 may further be transmitted or received over a communications network 1026 using a transmission medium via the network interface device 1020 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards), IEEE 802.15.4 family of standards, peer-to-peer (P2P) networks, among others. In an example, the network interface device 1020 may include one or more physical jacks (e.g., Ethernet, coaxial, or phone jacks) or one or more antennas to connect to the communications network 1026. In an example, the network interface device 1020 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1000, and includes digital or analog communications signals or other intangible medium to facilitate communication of such software.

It is understood that while this specification has focused on controlling a single mobile robot, the system may be configured to control multiple mobile robots at substantially the same time. It is understood that any of the examples, techniques, or the like discussed above may be applied to a single robot or as many robots operating at any given time.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Example 1 is a system for controlling a mobile robot, the system comprising: at least one processor; and memory, including instructions, which when executed by the at least one processor, cause the at least one processor to: determine a state of the mobile robot using at least one of: data provided by the mobile robot or data captured by one or more sensors proximate to or attached to the mobile robot; determine a state of an object proximate to the mobile robot using the data captured by the one or more sensors proximate to or attached to the mobile robot; identify information relating to one or more available stopping points of the mobile robot; identify a condition of the mobile robot that requires the mobile robot to stop, based on the determined state of the mobile robot and the determined state of the object; and issue a command to the mobile robot to navigate to a particular one of the one or more available stopping points.

In Example 2, the subject matter of Example 1 optionally includes wherein the information relating to the one or more available stopping points is captured by the one or more sensors proximate to or attached to the mobile robot.

In Example 3, the subject matter of Example 2 optionally includes wherein the at least one processor is further to: communicate the information relating to the one or more available stopping points to a cloud-based server; receive, from the cloud-based server, processed information relating to the one or more available stopping points; and in response to receiving the processed information relating to the one or more available stopping points, communicating the processed information to the mobile robot.

In Example 4, the subject matter of Example 3 optionally includes wherein the cloud-based server updates a map with the information relating to the one or more available stopping points captured by the one or more sensors, and wherein the processed information communicated to the mobile robot includes the updated map.

In Example 5, the subject matter of any one or more of Examples 2-4 optionally include wherein the information relating to the one or more available stopping points includes a location of the one or more available stopping points.

In Example 6, the subject matter of any one or more of Examples 2-5 optionally include wherein the information relating to the one or more available stopping points includes at least one of a distance from a roadway or a distance from a sidewalk.

In Example 7, the subject matter of any one or more of Examples 1-6 optionally include wherein to identify a condition of the mobile robot that requires the mobile robot to stop includes a determination that the mobile robot is: failing to follow a specified path; operating over a specified speed; and operating less than a specified distance from the object proximate to the mobile robot.

In Example 8, the subject matter of any one or more of Examples 1-7 optionally include wherein to identify a condition of the mobile robot that requires the mobile robot to stop includes to determine that the mobile robot requires charging or repair.

In Example 9, the subject matter of any one or more of Examples 1-8 optionally include wherein the state of the mobile robot includes data that indicates at least one of: a location of the mobile robot, a dimensional measurement of the mobile robot, a speed of the mobile robot, a current task of the mobile robot, a current route of the mobile robot, a current direction of the mobile robot, a target position of the mobile robot, a condition of a manipulator arm attached to the mobile robot, or a state of a load attached to the mobile robot.

In Example 10, the subject matter of Example 9 optionally includes wherein to issue a command to the mobile robot to navigate to a particular one of the one or more available stopping points includes providing at least one of an updated task, an updated route, or an updated direction to the mobile robot.

In Example 11, the subject matter of any one or more of Examples 1-10 optionally include wherein the at least one processor is further to: determine whether the mobile robot is reacting to the command; and responsive to a determination that the mobile robot is reacting to the command and a determination that the mobile robot has stopped at the particular one of the one or more available stopping points, cause a rescue device to be deployed to repair or evacuate the mobile robot from the particular one of the one or more available stopping points.

In Example 12, the subject matter of any one or more of Examples 1-11 optionally include wherein the at least one processor is further to: determine whether the mobile robot is reacting to the command; and responsive to a determination that the mobile robot is not reacting to the command, cause one or more rescue devices to be deployed to stop and evacuate the mobile robot.

Example 13 is at least one non-transitory computer-readable medium with instructions stored thereon, which when executed by a processor of a computing device, cause the processor to: determine a state of a mobile robot using at least one of: data provided by the mobile robot or data captured by one or more sensors proximate to or attached to the mobile robot; determine a state of an object proximate to the mobile robot using the data captured by the one or more sensors proximate to or attached to the mobile robot; identify information relating to one or more available stopping points; identify a condition of the mobile robot that requires the mobile robot to stop, based on the determined state of the mobile robot and the determined state of the object; and issue a command to the mobile robot to navigate to a particular one of the one or more available stopping points.

In Example 14, the subject matter of Example 13 optionally includes wherein the information relating to the one or more available stopping points is captured by the one or more sensors proximate to or attached to the mobile robot, and wherein the information relating to the one or more available stopping points includes at least one of: a location of the one or more available stopping points, a distance from a roadway, or a distance from a sidewalk.

In Example 15, the subject matter of Example 14 optionally includes wherein the instructions cause the at least one processor further to: communicate the information relating to the one or more available stopping points to a cloud-based server; receive, from the cloud-based server, processed information relating to the one or more available stopping points; and in response to receiving the processed information relating to the one or more available stopping points, communicating the processed information to the mobile robot.

In Example 16, the subject matter of Example 15 optionally includes wherein the cloud-based server updates a map with the information relating to the one or more available stopping points captured by the one or more sensors, and wherein the processed information communicated to the mobile robot includes the updated map.

In Example 17, the subject matter of any one or more of Examples 13-16 optionally include wherein to identify a condition of the mobile robot that requires the mobile robot to stop includes at least one of: a determination that the mobile robot requires charging or repair, or a determination that the mobile robot is: failing to follow a specified path; operating over a specified speed; and operating less than a specified distance from the object proximate to the mobile robot.

In Example 18, the subject matter of any one or more of Examples 14-17 optionally include wherein the instructions further cause the processor to: determine whether the mobile robot is reacting to the command; responsive to a determination that the mobile robot is reacting to the command and a determination that the mobile robot has stopped at the particular one of the one or more available stopping points, cause one or more rescue devices to be deployed to repair or evacuate the mobile robot from the particular one of the one or more available stopping points; and responsive to a determination is not reacting to the command, cause the one or more rescue devices to be deployed to stop and evacuate the mobile robot, wherein the one or more rescue devices includes at least one of a second mobile robot, wherein the second mobile robot is a fully autonomous mobile robot or a transport platform configurable to capture and disengage the mobile robot, and wherein at least one of the second mobile robot or the transport platform is configured to determine a location to perform a stopping maneuver or an evacuation maneuver.

Example 19 is a system for controlling a mobile robot, the system comprising: means for determining a state of the of the mobile robot using at least one of: data provided by the mobile robot or data captured by one or more sensing means proximate to or attached to the mobile robot; means for determining a state of an object proximate to the mobile robot using the data captured by the one or more sensing means proximate to or attached to the mobile robot; means for identifying information relating to one or more available stopping points; means for identifying a condition of the mobile robot that requires the mobile robot to stop; and means for issuing a command to the mobile robot to navigate to a particular one of the one or more available stopping points.

In Example 20, the subject matter of Example 19 optionally includes wherein the information relating to the one or more available stopping points is captured by the one or more sensing means proximate to or attached to the mobile robot.

In Example 21, the subject matter of Example 20 optionally includes means for communicating the information relating to the one or more available stopping points to a cloud-based server; means for receiving, from the cloud-based server, processed information relating to the one or more available stopping points; and means for, in response to receiving the processed information relating to the one or more available stopping points, communicating the processed information to the mobile robot; wherein the cloud-based server updates a map with the information relating to the one or more available stopping points captured by the one or more sensing means, and wherein the processed information communicated to the mobile robot includes the updated map.

In Example 22, the subject matter of any one or more of Examples 19-21 optionally include wherein to identify a condition of the mobile robot that requires the mobile robot to stop includes at least one of: a determination that the mobile robot requires charging or repair, or a determination that the mobile robot is: failing to follow a specified path; operating over a specified speed; and operating less than a specified distance from the object proximate to the mobile robot.

In Example 23, the subject matter of any one or more of Examples 19-22 optionally include means for determining whether the mobile robot is reacting to the command; means for, responsive to a determination that the mobile robot is reacting to the command and a determination that the mobile robot has stopped at the particular one of the one or more available stopping points, causing one or more rescue devices to be deployed to repair or evacuate the mobile robot from the particular one of the one or more available stopping points; and means for, responsive to a determination is not reacting to the command, causing the one or more rescue devices to be deployed to stop and evacuate the mobile robot, wherein the one or more rescue devices includes at least one of a second mobile robot, wherein the second mobile robot is a fully autonomous mobile robot or a transport platform configurable to capture and disengage the mobile robot, and wherein at least one of the second mobile robot or the transport platform is configured to determine a location to perform a stopping maneuver or an evacuation maneuver.

Example 24 is a mobile rescue device, comprising: at least one processor; memory, including instructions, which when executed by the at least one processor, cause the at least one processor to: receive a notification that a mobile robot is not reacting to a command; in response to the notification, navigate to an area in which the mobile robot that is not reacting to the command is located; determine a location to perform at least one of a stopping maneuver or an evacuation maneuver of the mobile robot that is not reacting to the command; and perform at least one of the stopping maneuver or the evacuation maneuver of the mobile robot that is not reacting to the command.

In Example 25, the subject matter of Example 24 optionally includes wherein the mobile rescue device is a fully autonomous mobile robot or a mobile transport platform configurable to capture and disengage the mobile robot that is not reacting to the command, wherein the notification includes an instruction to at least one of stop, capture, or disengage the mobile robot that is not reacting to the command, and wherein the notification further includes an exact location in the area in which the mobile robot that is not reacting to the command is located.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for controlling a mobile robot, the system comprising:

at least one processor; and memory, including instructions, which when executed by the at least one processor, cause the at least one processor to:

determine a state of the mobile robot using at least one of: data provided by the mobile robot or data captured by one or more sensors proximate to or attached to the mobile robot;

determine a state of an object proximate to the mobile robot using the data captured by the one or more sensors proximate to or attached to the mobile robot;

identify information relating to one or more available stopping points of the mobile robot;

evaluate the one or more available stopping points to identify one or more qualified stopping points, wherein evaluating the one or more available stopping points includes determining whether the one or more available stopping points satisfy one or more safety rules, including at least one of:

an availability of the one or more available stopping points based on a current condition around the one or more available stopping points, or a selection of a safest possible stopping point when no qualified stopping point is available;

identify a condition of the mobile robot that requires the mobile robot to stop, based on the determined state of the mobile robot and the determined state of the object;

issue a command to the mobile robot to navigate to a particular one of the one or more available stopping points that satisfies the one or more safety rules;

determine whether the mobile robot is reacting to the command;

responsive to a determination that the mobile robot is reacting to the command and a determination that the mobile robot has stopped at the particular one of the one or more available stopping points, cause one or more rescue devices to be deployed to repair or evacuate the mobile robot from the particular one of the one or more available stopping points; and responsive to a determination that the mobile robot is not reacting to the command, cause the one or more rescue devices to be deployed to stop and evacuate the mobile robot, wherein the one or more rescue devices includes at least one of a second mobile robot, wherein the second mobile robot is a fully autonomous mobile robot or a transport platform configurable to capture and disengage the mobile robot, and wherein at least one of the second mobile robot or the transport platform is configured to determine a location to perform a stopping maneuver or an evacuation maneuver.

2. The system of claim 1, wherein the information relating to the one or more available stopping points is captured by the one or more sensors proximate to or attached to the mobile robot, and wherein the one or more safety rules further include a minimum clearance area around the one or more available stopping points.

3. The system of claim 2, wherein the at least one processor is further to:

communicate the information relating to the one or more available stopping points to a cloud-based server;

receive, from the cloud-based server, processed information relating to the one or more available stopping points; and in response to receiving the processed information relating to the one or more available stopping points, communicating the processed information to the mobile robot.

4. The system of claim 3, wherein the cloud-based server updates a map with the information relating to the one or more available stopping points captured by the one or more sensors, and wherein the processed information communicated to the mobile robot includes the updated map.

5. The system of claim 2, wherein the information relating to the one or more available stopping points includes a location of the one or more available stopping points.

6. The system of claim 2, wherein the information relating to the one or more available stopping points includes at least one of a distance from a roadway or a distance from a sidewalk.

7. The system of claim 1, wherein to identify a condition of the mobile robot that requires the mobile robot to stop includes a determination that the mobile robot is:

failing to follow a specified path;

operating over a specified speed; and operating less than a specified distance from the object proximate to the mobile robot.

8. The system of claim 1, wherein to identify a condition of the mobile robot that requires the mobile robot to stop includes to determine that the mobile robot requires charging or repair.

9. The system of claim 1, wherein the state of the mobile robot includes data that indicates at least one of: a location of the mobile robot, a dimensional measurement of the mobile robot, a speed of the mobile robot, a current task of the mobile robot, a current route of the mobile robot, a current direction of the mobile robot, a target position of the mobile robot, a condition of a manipulator arm attached to the mobile robot, or a state of a load attached to the mobile robot.

10. The system of claim 9, wherein to issue a command to the mobile robot to navigate to a particular one of the one or more available stopping points includes providing at least one of an updated task, an updated route, or an updated direction to the mobile robot.

11. At least one non-transitory computer-readable medium with instructions stored thereon, which when executed by at least one processor of a computing device, cause the at least one processor to:

determine a state of a mobile robot using at least one of: data provided by the mobile robot or data captured by one or more sensors proximate to or attached to the mobile robot;

determine a state of an object proximate to the mobile robot using the data captured by the one or more sensors proximate to or attached to the mobile robot;

identify information relating to one or more available stopping points;

evaluate the one or more available stopping points to identify one or more qualified stopping points, wherein evaluating the one or more available stopping points includes determining whether each of the one or more available stopping points satisfy one or more safety rules, including at least one of:

an availability of the one or more available stopping points based on a current condition around the one or more available stopping points, or a selection of a safest possible stopping point when no qualified stopping point is available;

identify a condition of the mobile robot that requires the mobile robot to stop, based on the determined state of the mobile robot and the determined state of the object;

issue a command to the mobile robot to navigate to a particular one of the one or more available stopping points that satisfies the one or more safety rules;

determine whether the mobile robot is reacting to the command;

responsive to a determination that the mobile robot is reacting to the command and a determination that the mobile robot has stopped at the particular one of the one or more available stopping points, cause one or more rescue devices to be deployed to repair or evacuate the mobile robot from the particular one of the one or more available stopping points; and responsive to a determination that the mobile robot is not reacting to the command, cause the one or more rescue devices to be deployed to stop and evacuate the mobile robot, wherein the one or more rescue devices includes at least one of a second mobile robot, wherein the second mobile robot is a fully autonomous mobile robot or a transport platform configurable to capture and disengage the mobile robot, and wherein at least one of the second mobile robot or the transport platform is configured to determine a location to perform a stopping maneuver or an evacuation maneuver.

12. The at least one non-transitory computer-readable medium of claim 11, wherein the information relating to the one or more available stopping points is captured by the one or more sensors proximate to or attached to the mobile robot, and wherein the information relating to the one or more available stopping points includes at least one of:

a location of the one or more available stopping points, a distance from a roadway, or a distance from a sidewalk.

13. The at least one non-transitory computer-readable medium of claim 12, wherein the instructions cause the at least one processor further to:

communicate the information relating to the one or more available stopping points to a cloud-based server;

receive, from the cloud-based server, processed information relating to the one or more available stopping points; and in response to receiving the processed information relating to the one or more available stopping points, communicating the processed information to the mobile robot.

14. The at least one non-transitory computer-readable medium of claim 13, wherein the cloud-based server updates a map with the information relating to the one or more available stopping points captured by the one or more sensors, and wherein the processed information communicated to the mobile robot includes the updated map.

15. The at least one non-transitory computer-readable medium of claim 11, wherein to identify a condition of the mobile robot that requires the mobile robot to stop includes at least one of: a determination that the mobile robot requires charging or repair, or a determination that the mobile robot is:

failing to follow a specified path;

operating over a specified speed; and operating less than a specified distance from the object proximate to the mobile robot.

16. A system for controlling a mobile robot, the system comprising:

means for determining a state of the of the mobile robot using at least one of: data provided by the mobile robot or data captured by one or more sensing means proximate to or attached to the mobile robot;

means for determining a state of an object proximate to the mobile robot using the data captured by the one or more sensing means proximate to or attached to the mobile robot;

means for identifying information relating to one or more available stopping points;

means for evaluating the one or more available stopping points to identify one or more qualified stopping points, wherein evaluating the one or more available stopping points includes determining whether each of the one or more available stopping points satisfy one or more safety rules, including at least one of:

an availability of the one or more available stopping points based on a current condition around the one or more available stopping points, or a selection of a safest possible stopping point when no qualified stopping point is available;

means for identifying a condition of the mobile robot that requires the mobile robot to stop;

means for issuing a command to the mobile robot to navigate to a particular one of the one or more available stopping points that satisfies the one or more safety rules;

means for determining whether the mobile robot is reacting to the command;

means for, responsive to a determination that the mobile robot is reacting to the command and a determination that the mobile robot has stopped at the particular one of the one or more available stopping points, causing one or more rescue devices to be deployed to repair or evacuate the mobile robot from the particular one of the one or more available stopping points; and means for, responsive to a determination that the mobile robot is not reacting to the command, causing the one or more rescue devices to be deployed to stop and evacuate the mobile robot, wherein the one or more rescue devices includes at least one of a second mobile robot, wherein the second mobile robot is a fully autonomous mobile robot or a transport platform configurable to capture and disengage the mobile robot, and wherein at least one of the second mobile robot or the transport platform is configured to determine a location to perform a stopping maneuver or an evacuation maneuver.

17. The system of claim 16, wherein the information relating to the one or more available stopping points is captured by the one or more sensing means proximate to or attached to the mobile robot.

18. The system of claim 17, further comprising:

means for communicating the information relating to the one or more available stopping points to a cloud-based server;

means for receiving, from the cloud-based server, processed information relating to the one or more available stopping points; and means for, in response to receiving the processed information relating to the one or more available stopping points, communicating the processed information to the mobile robot;

wherein the cloud-based server updates a map with the information relating to the one or more available stopping points captured by the one or more sensing means, and wherein the processed information communicated to the mobile robot includes the updated map.

19. The system of claim 16, wherein to identify a condition of the mobile robot that requires the mobile robot to stop includes at least one of: a determination that the mobile robot requires charging or repair, or a determination that the mobile robot is:

failing to follow a specified path;

operating over a specified speed; and operating less than a specified distance from the object proximate to the mobile robot.

20. A mobile rescue device, comprising:

at least one processor, memory, including instructions, which when executed by the at least one processor, cause the at least one processor to:

receive a notification that a mobile robot is not reacting to a command;

in response to the notification, navigate to an area in which the mobile robot that is not reacting to the command is located;

determine a location to perform at least one of a stopping maneuver or an evacuation maneuver of the mobile robot that is not reacting to the command; and perform at least one of the stopping maneuver or the evacuation maneuver of the mobile robot that is not reacting to the command, wherein the mobile rescue device is a fully autonomous mobile robot or a mobile transport platform configurable to capture and disengage the mobile robot that is not reacting to the command, wherein the notification includes an instruction to at least one of stop, capture, or disengage the mobile robot that is not reacting to the command, and wherein the notification further includes an exact location in the area in which the mobile robot that is not reacting to the command is located.

* * * * *